United States Patent [19]

D'Oro et al.

[11] 3,821,741

[45] June 28, 1974

[54] TRACKING SYSTEM WITH POINTING ERROR DETECTOR

[75] Inventors: Enzo Cavalieri D'Oro, Monza; Luciano Salari, Milan, both of Italy

[73] Assignee: Societa Italiana Telecomunicazioni SIEMENS S.p.A., Milan, Italy

[22] Filed: Nov. 22, 1972

[21] Appl. No.: 308,850

[30] Foreign Application Priority Data
Nov. 24, 1971 Italy .................................. 31579/71

[52] U.S. Cl. ...... 343/117 R, 343/16 M, 343/113 R, 343/786
[51] Int. Cl. ............................................. G01s 3/42
[58] Field of Search ............ 343/117 R, 113 R, 786, 343/16 M

[56] References Cited
UNITED STATES PATENTS
3,369,197   2/1968   Giger et al. .......................... 343/786
3,383,688   5/1968   Renaudie ........................ 343/113 R Primary Examiner—Maynard R. Wilbur
Assistant Examiner—Richard E. Berger
Attorney, Agent, or Firm—Karl F. Ross; Herbert Dubno

[57] ABSTRACT

A tracking system, e.g. for following the course of a communications satellite, has a horn-reflector antenna working into a generally cylindrical coupler with three axially spaced circular waveguide sections interconnected by frustoconical transition sections, i.e. a large-diameter section propagating the dominant mode $TE^o{}_{11}$ and two higher modes $TM^o{}_{01}$, $TE^o{}_{21}$, an intermediate-diameter section propagating only the $TE^o{}_{11}$ and $TM^o{}_{01}$ modes, and a small-diameter section cutting off all except the $TE^o{}_{11}$ mode. The two higher modes $TM^o{}_{01}$ and $TE^o{}_{21}$, coming into existence only when the incoming beacon wave is disaligned with the horn axis, provide a measure of the pointing error the antenna; for correcting this disalignment, a first error signal corresponding to the $TM^o{}_{01}$ mode is extracted from the intermediate-diameter waveguide section by a first pair of diametrically opposite rectangular waveguide branches with major sides transverse to the cylinder axis whereas a second error signal corresponding to the $TE^o{}_{21}$ mode is extracted from the large-diameter waveguide section by a second pair of diametrically opposite rectangular waveguide branches, offset from the first pair by 90°, whose major sides are parallel to the cylinder axis. The two error signals are isolated by additively combining the outputs of the first pair of rectangular waveguide branches and subtractively combining the outputs of the second pair of rectangular waveguide branches with the aid of a first and a second magic T, respectively, working together into a third magic T whose summing and differential outputs deliver corrective voltages to a controller for the antenna.

6 Claims, 8 Drawing Figures

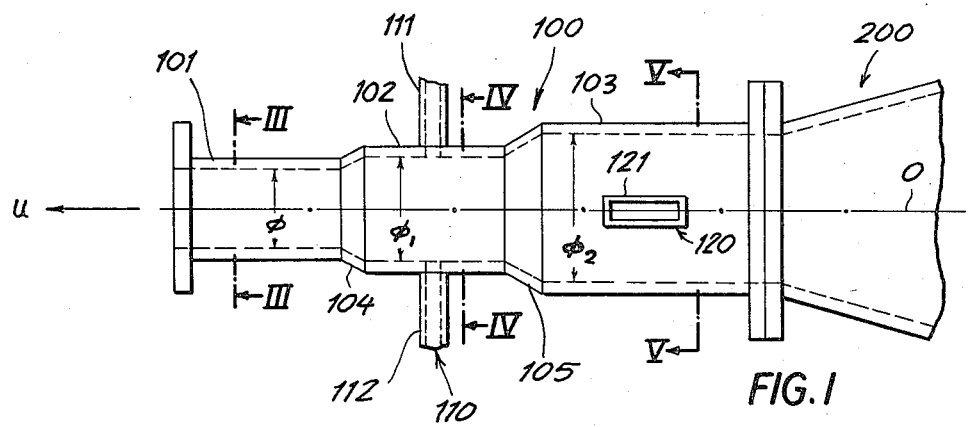
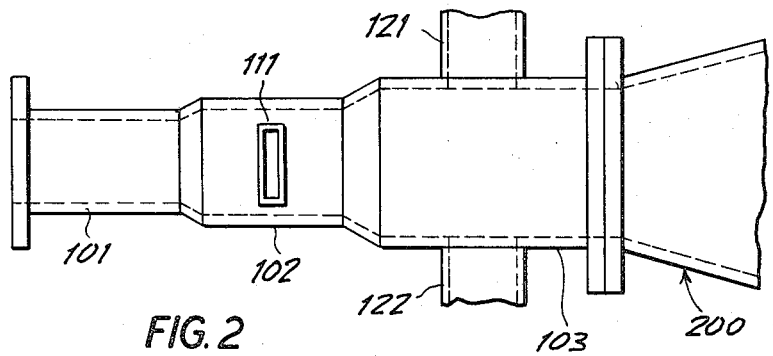
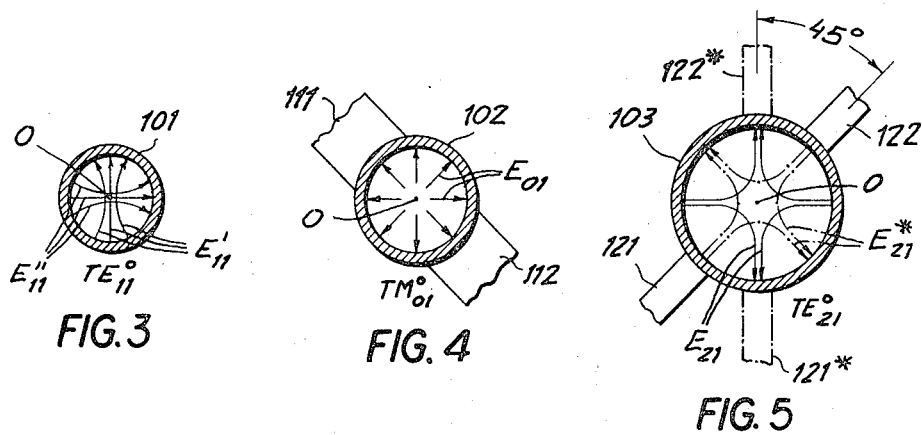

TRACKING SYSTEM WITH POINTING ERROR DETECTOR

FIELD OF THE INVENTION

Our present invention relates to a tracking system of the type in which a reflector antenna, e.g. of the horn type, is held trained upon a target emitting high-frequency radiation to be received by that antenna. The target could be a reflecting object, as in the case of a tracking radar, or could carry its own beacon emitter, as in the case of a communications satellite.

BACKGROUND OF THE INVENTION

An automatic tracking system, designed to detect any disalignment between the reflector axis and the target (hereinafter referred to as a pointing error) by extracting a corrective signal from the antenna output, has been described in an article by J. S. Cook and R. Lowell published in July 1963 in the Bell System Technical Journal, pages 1283 – 1307. In that system, a waveguide of circular cross-section connected to the horn of the antenna propagates only a fundamental or dominant mode if the pointing error is zero, i.e. if the antenna is exactly on target. In other instances, the waveguide is excited in a higher mode which is utilized in retrieving the corrective signal actuating a control mechanism to reorient the antenna.

This conventional system has its limitations in that it can be used only with substantially circular polarization of the incident wave.

OBJECTS OF THE INVENTION

An object of our present invention is to provide an improved tracking system of this character which operates also with incident waves of strongly elliptical or even linear polarization.

Another object is to provide means in such a system for providing two distinct error signals, respectively indicating the angle of disalignment in two orthogonal planes, which are mutually decoupled so as to be substantially unaffected by phase variations in the output of the waveguide structure.

A further object is to provide circuitry enabling recovery of the error signals while leaving substantially unaffected the dominant mode which carries the information to be processed (e.g. messages from a communications satellite).

It is also an object of our invention to provide a tracking system adapted to be used over a wide band of operating frequencies.

SUMMARY OF THE INVENTION

The foregoing objects are realized, in accordance with our present invention, by the provision of a coupler in the form of a tubular conductive structure of circular cross-section connected to the antenna to serve as a waveguide for the radiant energy received, this structure including a preferably cylindrical output section remote from the antenna, a first preferably cylindrical coupling section closer to the antenna and a second preferably cylindrical coupling section proximal to the antenna. The three circular sections, whose diameters progressively increase from the output section to the second coupling section, are so dimensioned as to sustain only the dominant mode at the operating frequency in the output section, this dominant mode and one higher mode in the first coupling section, and both these modes together with one other higher mode in the second coupling section. The two higher modes are separately extracted by a first and a second waveguide of rectangular cross-section respectively conneced to the first and the second coupling section in conjugate relationship, i.e. with their major surfaces in mutually perpendicular planes; each of these rectangular waveguides is so oriented and dimensioned as to pick up only the mode to be extracted from the associated coupling section. From the outputs of these two rectangular waveguides the error signals are fed to the antenna controller for correcting the position of the reflector axis.

As more specifically described hereinafter, the three modes referred to are the dominant circular $TE_{11}$ mode (hereinafter designated $TE°_{11}$), a first higher circular mode $TM°_{01}$ and a second higher circular mode $TE°_{21}$. In order to pick up the $TM°_{01}$ mode, the first rectangular waveguide has its major surfaces transverse to the axis of the first circular coupling section; conversely, in order to pick up the $TE°_{21}$ mode, the second waveguide has its major surfaces parallel to the axis of the second circular coupling section. Generally, the several circular waveguide sections will be coaxial with one another and with the adjoining throat of the horn antenna, being separated from one another by transition sections of substantially frustoconical shape.

With the two rectangular waveguides joining the respective coupling sections at locations mutually offset by 90°, the two error signals can be isolated with the aid of several hybrid-type T junctions (magic T's) connected in tandem, namely a first T having lateral inputs connected to diametrically opposite branches of the first rectangular waveguide, a second T having lateral inputs similarly connected to diametrically opposite branches of the second rectangular waveguide, and a third T having lateral inputs respectively connected to a summing output of the first T and to a differential output of the second T; corrective voltages then appear on the summing and differential outputs of the third T. The unused outputs of the first and second T's are terminated by dummy loads in the form of constant impedances which could be adjustable if desired; these terminating impedances could be of zero magnitude, i.e. could form short circuits, so that the magic T is converted into a simple T junction.

BRIEF DESCRIPTION OF THE DRAWING

The above and other features of our invention will now be described in detail with reference to the accompanying drawing in which:

FIG. 1 is a side view of a waveguide structure, connected to a horn antenna, embodying the present invention;

FIG. 2 is a view similar to FIG. 1 but taken at right angles thereto;

FIGS. 3, 4 and 5 are diagrammatic cross-sectional views taken on lines III — III, IV — IV and V — V of FIG. 1;

SPECIFIC DESCRIPTION

Figure 8:
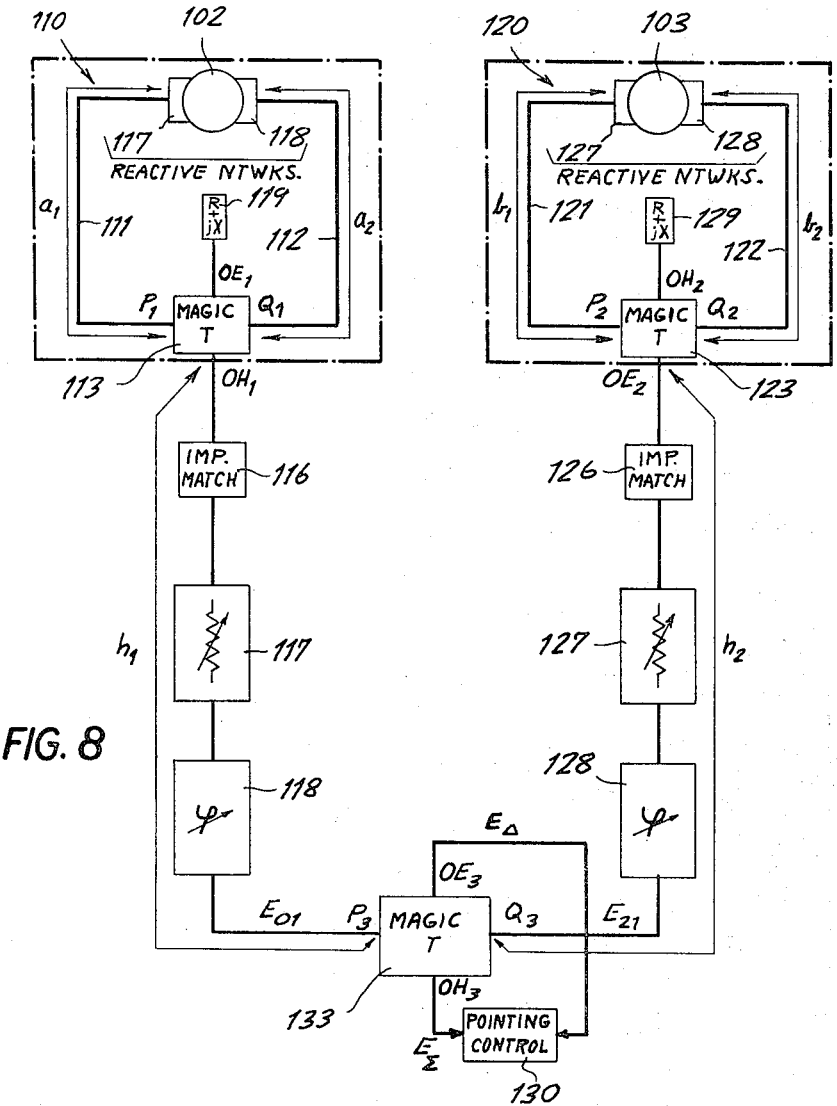
FIG. 8 is a block diagram of an output circuit for the structure of FIGS. 1 – 5.

In FIGS. 1 – 5 we have shown a coupler 100 according to our invention structurally integral with a horn antenna 200, the coupler consisting essentially of three cylindrical waveguide sections 101, 102, 103 of circular cross-section interconnected by frustoconical sections 104, 105. Section 101, remote from antenna 200, delivers a voltage $u$ at the frequency of an incident wave intercepted by the antenna; this voltage $u$ may carry a message relayed by a communications satellite on which the antenna 200 is trained, or may convey information as to the speed of a target in the sight of the horn. Voltage $u$ is demodulated by conventional means not relevant to the present invention. The antenna 200 may have a mouth rotatable in elevation, independently of coupler 100, as described in the aforementioned article by Cook and Lowell.

Cylindrical sections 101, 102 and 103 are of progressively increasing inner diameters $\Phi$, $\Phi_1$ and $\Phi_2$, the latter equaling the diameter of the horn 200 at the output end of its converging throat.

A first waveguide 110 of rectangular cross-section, with diametrically opposite branches 111 and 112, is connected to cylindrical section 102 with its major surfaces transverse to the axis O of structure 100. A second waveguide 120, also of rectangular cross-section, has branches 121, 122 connected to cylindrical section 103 at diametrically opposite locations offset by 90° with reference to the junctions formed between section 102 and branches 111, 112; the major surfaces of waveguide 120 are parallel to axis O. The minor sides of both these waveguides are so narrow as not to sustain the propagation of modes, at the frequency of the incident radiation, in which the electric field vector is parallel to their major sides.

The electrical-field distribution of the dominant mode $TE°_{11}$, the first higher mode $TM°_{01}$ and the second higher mode $TE°_{21}$ have been illustrated in FIGS. 3, 4 and 5, respectively; reference may be made to the article by Cook and Lowell for the distribution of the electric and magnetic fields of the $TE°_{11}$ and $TM°_{01}$ modes in both the axial and the transverse plane. Mode $TE°_{11}$ is sustained throughout the structure 100; mode $TM°_{01}$ is cut off by output section 101 whereas mode $TE°_{21}$ cannot pass beyond coupling section 103.

Figure 6:
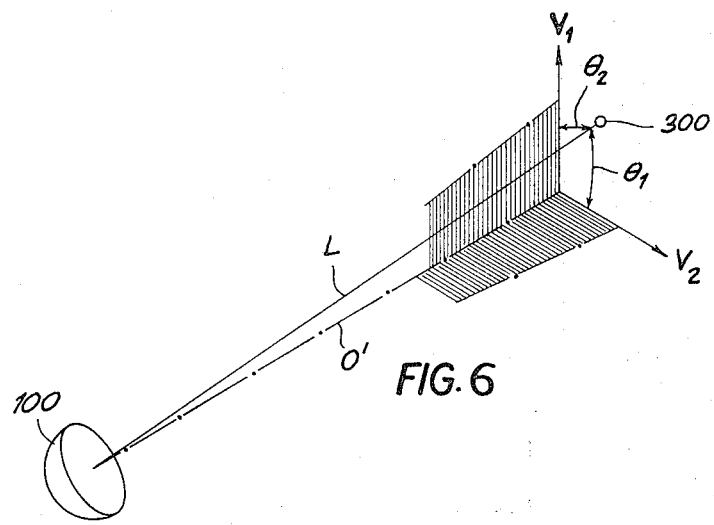
FIG. 6 is a perspective diagram showing the pointing error in a tracking system to which the invention is applied.

In FIG. 6 we have shown the axis 0' of the antenna mouth together with two vectors $V_1$ and $V_2$ defining with that axis a pair of orthogonal planes which, for convenience, have been chosen vertical and horizontal, respectively. A target 300, whose line of sight with reference to the center of the antenna mouth has been shown at L, is offset from the axis 0' with a deviation definable by two angles $\theta_1$ and $\theta_2$, these being the angles included by line L with the horizontal and the vertical axial plane, respectively. The antenna is on target with $\theta_1 = \theta_2 = 0$.

Vectors $V_1$ and $V_2$ are the vertical and horizontal components of the electric field of an incident high-frequency wave with circular or other polarization. These two vectors excite respective voltages $E'_{11}$ and $E''_{11}$ (FIG. 3) which have also been shown as vertical and horizontal, respectively, even though they are not necessarily codirectional with these free-space vectors since, as will be apparent from the article referred to, the axes O and O' do not coincide. In fact, as noted by the authors of that article, the coupler (here the structure 100) does not rotate with the horn (200) in elevation so that a translation of co-ordinates between the coupler output and the antenna positioner will be required which must take into account the varying relative positions of the coupler and the horn.

The electric field lines $E_{01}$ shown in FIG. 4 (and the accompanying magnetic field lines) have the same aspect whether generated by wave component $V_1$ or $V_2$. The same applies to the field lines $E_{21}$ of FIG. 5, yet in that case there exists also a pattern $E^*_{21}$ which is offset by 45° from the main pattern $E_{21}$ and is generated by component $V_1$ if $\theta_2 \neq 0$ or by component $V_2$ if $\theta_1 \neq 0$. In the case of a plane-polarized incident wave with a vertical electric field vector, for example, pattern $E^*_{21}$ disappears if $\theta_2 = 0$ and, for small angles, is directly proportional to $\theta_2$ so that waveguide 120, upon relocation to a position 121*, 122* (phantom lines) offset by 45° from the full-line position, has an output corresponding in sign and magnitude to angle $\theta_2$ whereas angle $\theta_1$ is determined from the output of waveguide 110. In the more general case of elliptical or circular polarization, however, pattern $E^*_{21}$ is not used.

Figure 7:
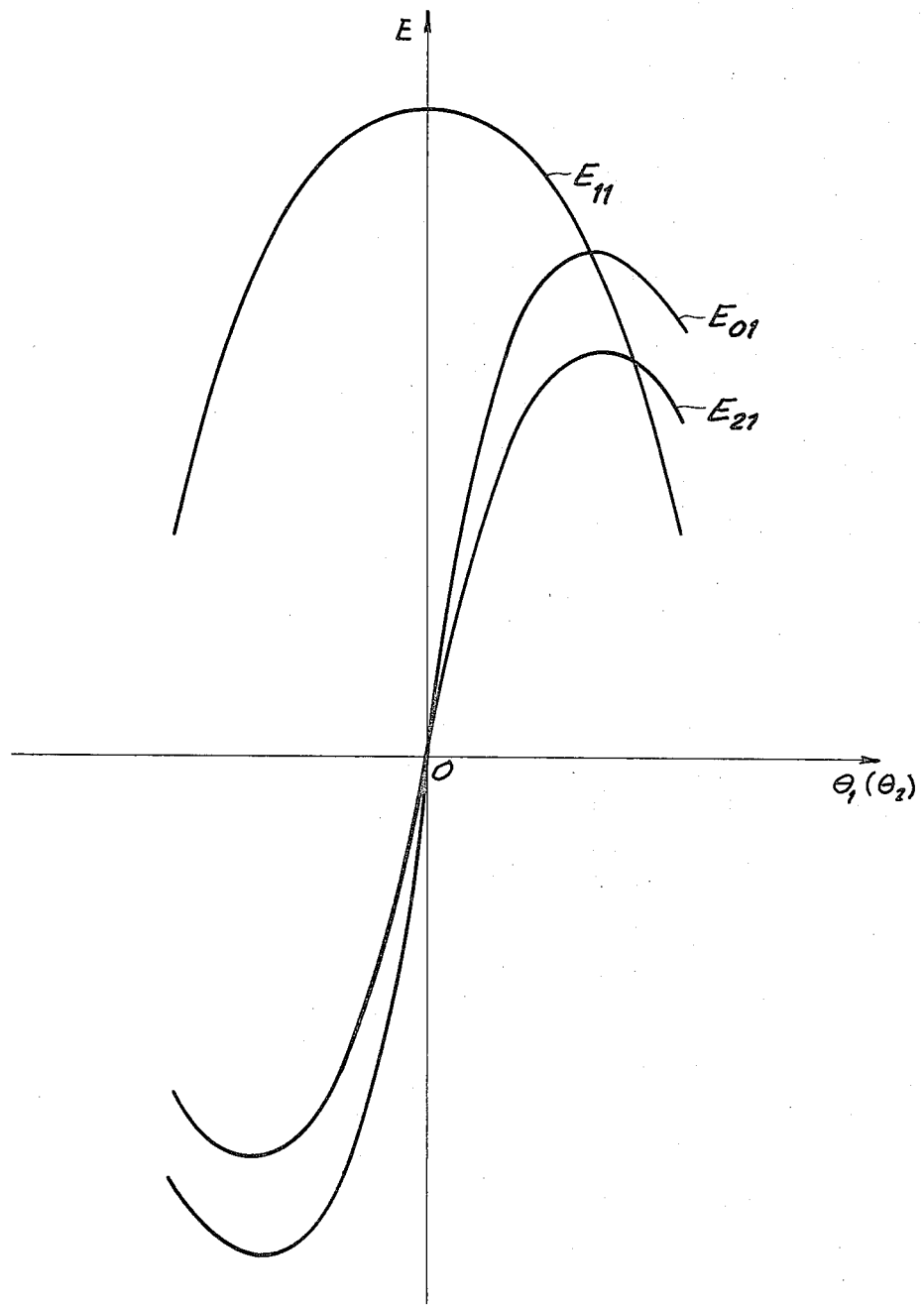
FIG. 7 is a graph showing the electric field in the waveguide structure for the several modes of propagation as a function of pointing error.

In FIG. 7 we have shown the relationship between the waveguide voltages $E_{11}$, $E_{01}$, $E_{21}$ of FIGS. 3 – 5 as excited by a single wave component $V_1$ or $V_2$ in the presence of a pointing error within the corresponding plane, i.e. as a function of $\theta_1$ in the case of vector $V_1$ and of $\theta_2$ in the case of vector $V_2$. With the illustrated orientation of waveguides 110 and 120 relative to each other and to the chosen direction of positive fields $E'$ and $E''$, i.e. with the plane of waveguide 120 bisecting the right angle between these positive field vectors while waveguide 110 is perpendicular to that plane, it can be shown that $$E_{01} = K_M(V_1 \cdot \theta_1 + V_2 \cdot \theta_2) \tag{1}$$

and $$E_{21} = K_E(V_1 \cdot \theta_1 - V_2 \cdot \theta_2) \tag{2}$$

For small values of $\theta_1$ and $\theta_2$, the factors $K_E$ and $K_M$ are practically constant and, with suitable selection of circuit parameters, can be made equal to each other so that $$K_E = K_M = K \tag{3}$$

From equations (1) and (2) we can now derive the values of angles $\theta_1$ and $\theta_2$ in terms of a sum voltage $E_\Sigma = E_{01} + E_{21}$ and a difference voltage $E_\Delta = E_{01} - E_{21}$, i.e.:

$$E_\Sigma = 2KV_1\theta_1 \tag{4}$$

and $$E_\Delta = 2KV_2\theta_2 \tag{5}$$

Voltages $E_\Sigma$ and $E_\Delta$ can thus be used to correct for the two angular deviations $\theta_1$ and $\theta_2$, respectively.

For small pointing errors, therefore, the two corrective voltages $E_\Sigma$ and $E_\Delta$ are completely decoupled since $E_\Sigma$ is independent of $\theta_2$ whereas $E_\Delta$ is independent of $\theta_1$. A phasing reference for determining the sign of these angles is available from output voltage $u$ whose polarity corresponds to that of voltage $E_{11}$ (see FIG. 7).

FIG. 8 shows a circuit arrangement for obtaining these corrective voltages from the outputs of waveguides 110 and 120. Branches 111 and 112 of waveguide 110 extract from waveguide section 102 the voltage component $E_{01}$ with the aid of a magic T 113 whose lateral inputs $P_1$ and $Q_1$ are joined to the output ends of these branches; the wave energies traveling through these branches pass along paths $a_1$ and $a_2$ of identical length and transmission characteristic, being then additively combined in the summing or magnetic-plane output $OH_1$ of this magic T. In an analogous manner, branches 121 and 122 of waveguide 120 extract from waveguide section 103 the voltage component $E_{21}$ with the aid of a magic T 123 whose lateral inputs $P_2$ and $Q_2$ are joined to the output ends of the latter branches; the two identical energy paths formed by these branches have been designated $b_1$ and $b_2$. The wave energies passing through these branches are subtractively combined in the differential or electric-plane output $OE_2$ of magic T 123. Adjustable attenuators 114, 124 and phase shifters 115, 125 in series with outputs $OH_1$ and $OE_2$, defining respective pathways $h_1$ and $h_2$ for voltages $E_{01}$ and $E_{21}$, serve to select the desired parameter $K_M = K_E = K$. The two voltages $E_{01}$ and $E_{21}$ are fed to lateral inputs $P_3$ and $Q_3$ of a third magic T 133 whose summing output $OH_3$ and differential output $OE_3$ carry the mutually decoupled error signals $E_\Sigma$ and $E_\Delta$, respectively; these signals are transmitted to a control circuit 130 which corrects the pointing of antenna 200 in a manner known per se.

We shall now describe several measures in the system of FIG. 3 to minimize the distortion experienced by dominant mode $TE°_{11}$ as a result of the extraction of the error voltages from waveguide sections 102 and 103. Since the technique is the same for both these waveguide sections, this description shall be limited to section 102 and associated circuitry.

Let $Z°_{11}$ and $Z°_{01}$ be the charateristic impedance of waveguide secton 102 for the dominant mode $TE°_{11}$ and the higher mode $TM°_{01}$, respectively, with $Z^=_0$ representing the characteristic impedance of the rectangular waveguide 110 for the corresponding mode $TM^=_{01}$. In order to extract maximum energy at that mode without introducing undue noise into output signal $u$, the two characteristic impedances $Z°_{01}$ and $Z^=_0$ should be as nearly identical as possible whereas the ratio $Z^=_0/Z°_{11}$ should be kept low. This can be accomplished by suitable choice of the dimensions of the waveguides. Diameter $\Phi_1$ of section 102 should be so small that its cut-off frequency for the $TM°_{01}$ mode is just below the lower limit of the range of operating frequencies; similarly, the width of the major sides of rectangular waveguide 110 should be limited to provide a cut-off frequency for the $TM_{01}$ mode close to that of circular waveguide section 102. In this way, broadband coupling between waveguides 102 and 110 for the $TM_{01}$ mode is achieved.

FIG. 8 also shows impedance-matching networks 116, 126 connected to magic-T outputs $OH_1$, $OE_2$ as well as reactive networks 117, 118 at the junctions of waveguide section 102 with branches 111, 112 and similar networks 127, 128 at the junctions of waveguide sections 103 with branches 121, 122.

The differential output $OE_1$ of magic T 113 and the summing output $OH_2$ of magic T 123 are terminated by respective dummy loads 119, 129. In the general case, these loads are complex impedances of the form $R + jX$. In a limiting instance, they may be replaced by short circuits whereby, for certain frequencies within the operating range (which may be referred to as antiresonant frequencies), the impedance of networks 117, 118 or 127, 128 as seen from coupler 100 becomes infinite. Between these antiresonant frequencies, whose magnitudes depend on the length of paths $a_1$, $a_2$ as well as other circuit parameters, frequency bands exist in which there is a substantial impedance match so that the effect of the discontinuities of the circular waveguide upon the dominant mode $T°_{11}$ is negligible. To increase the coupling between the cylindrical and rectangular waveguides for mode $TM_{01}$, junctions 117 and 118 may be located at such a distance from the output end 104 of section 102 (which represents a total reflector for mode $TM°_{01}$) that, at the point of extraction, the circular waveguide represents a virtual short circuit for that mode, i.e. that voltage $E_{01}$ is taken off at a pole of the standing wave developed for mode $TM°_{01}$ in the terminal part of section 102.

If the dummy loads 119 and 129 are made purely resistive and equal to the characteristic impedance $Z^=_0$ of the corresponding rectangular waveguide, antiresonant conditions are avoided for mode $TE°_{11}$ while impedance matching for this mode is present over a wider band substantially corresponding to the entire operating range; on the other hand, impedance matching for mode $TM°_{01}$ occurs only over a narrower frequency. The noise resulting from this resistive termination can be reduced by increasing the coefficient of reflection of networks 117, 118 (or 127, 128) and/or by lowering the characteristic impedance $Z^=_0$ as compared with the case of the short-circuited loads 119, 129.

The output circuitry of FIG. 8 can be simplified if the incoming wave is plane-polarized and its plane of polarization is known, as explained above with reference to FIG. 5.

We claim:

1. In a system for tracking a target emitting high-frequency radiation, including a reflector antenna provided with control means for keeping same trained upon the target to receive said radiation, the combination therewith of:

a tubular conductive structure of circular cross-section connected to said antenna for excitation thereby, said structure having an output section remote from said antenna, a first coupling section closer to said antenna and a second coupling section proximal to said antenna, said output section, first coupling section and second coupling section being of progressively larger diameter, said output section being dimensioned to sustain only a dominant circular mode $TE°_{11}$ of wave propagation at the frequency of said radiation, said first coupling section being dimensioned to sustain said dominant mode and one higher mode $TM°_{01}$ of wave propagation at said frequency, said second coupling section being dimensioned to sustain said dominant mode, said one higher mode and one other higher mode $TE°_{21}$ of wave propagation at said frequency;

first waveguide means of rectangular cross-section connected to said first coupling section, said first waveguide means being oriented and dimensioned to pick up said one higher mode to the substantial exclusion of said dominant mode and said other higher mode;

second waveguide means of rectangular cross-section conjugate to said first waveguide means and connected to said second coupling section, said second waveguide means being oriented and dimensioned to pick up said other higher mode to the substantial exclusion of said dominant mode and said one higher mode; and output circuitry connecting said first and second waveguide means to said control means for delivering thereto corrective signals tending to cancel a pointing error of said antenna giving rise to said higher modes;

each of said waveguide means comprising a pair of aligned waveguide branches extending from diametrically opposite sides of the corresponding coupling section of said structure, the first pair of aligned waveguide branches having major surfaces transverse to the axis of said first coupling section, the second pair of aligned waveguide branches having major surfaces parallel to the axis of said second coupling section, said first pair of waveguide branches being joined to said first coupling section at locations offset by 90° from the locations at which said second pair of waveguide branches are joined to said second coupling section;

said output circuitry including a first T junction with lateral inputs connected to said first pair of waveguide branches, a second T junction with lateral inputs connected to said second pair of waveguide branches, and a third T junction with lateral inputs respectively connected to a summing output of said first T junction and to a differential output of said second T junction; said third T junction having summing and differential outputs connected to said control means.

2. The combination defined in claim 1 wherein a differential output of said first T junction and a summing output of said second T junction are connected to respective dummy loads.

3. The combination defined in claim 2 wherein said dummy loads are short circuits.

4. The combination defined in claim 2 wherein said dummy loads are resistances substantially equaling the characteristic impedances of said first and second pairs of waveguide branches, respectively.

5. The combination defined in claim 1 wherein said output section, first coupling section and second coupling section are coaxially cylindrical and are separated from one another by substantially frustoconical transition sections.

6. The combination defined in claim 1 wherein said antenna comprises a horn with a converging throat adjoining said second coupling section, the latter having a diameter equaling the minimum diameter of said throat.

* * * * *